Oct. 16, 1956      F. L. RYDER      2,766,933
ELECTRICAL ANALYZER OF STRUCTURES
Filed June 21, 1950      3 Sheets-Sheet 1

Frederick L. Ryder INVENTOR.

Oct. 16, 1956   F. L. RYDER   2,766,933
ELECTRICAL ANALYZER OF STRUCTURES
Filed June 21, 1950   3 Sheets-Sheet 2
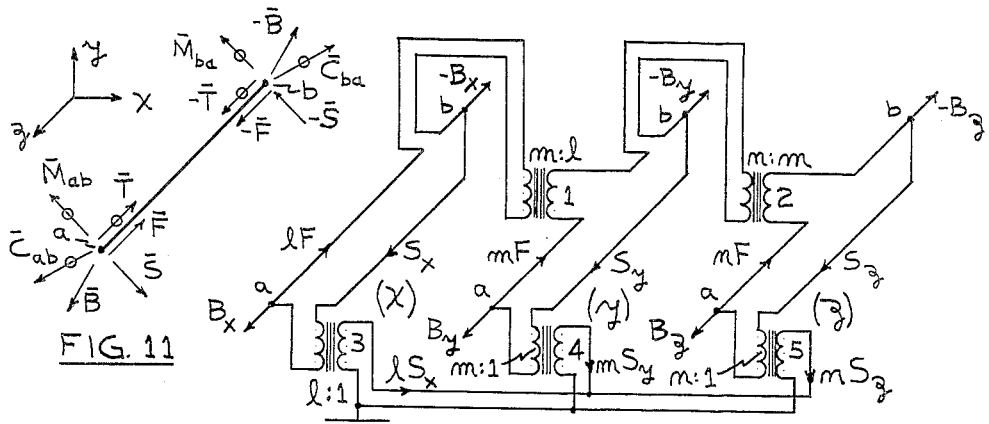
FIG. 11
FIG. 12
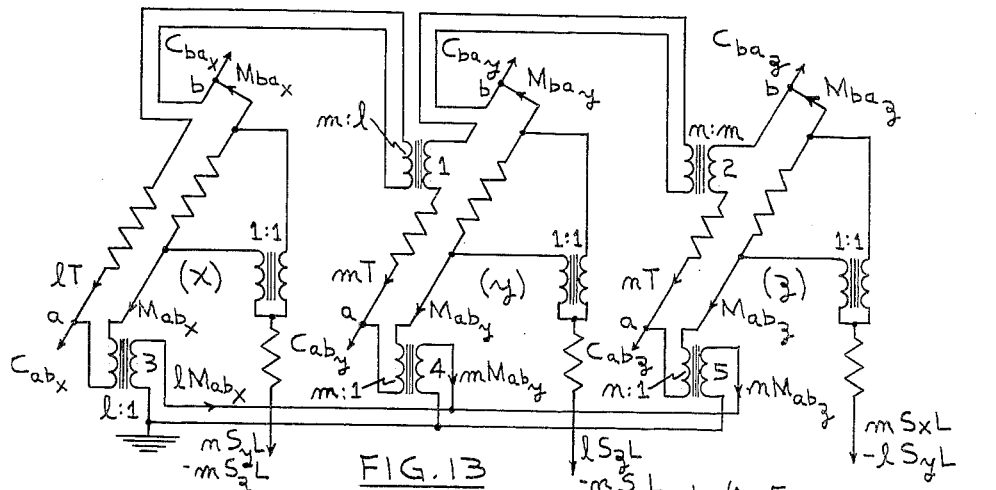
FIG. 13
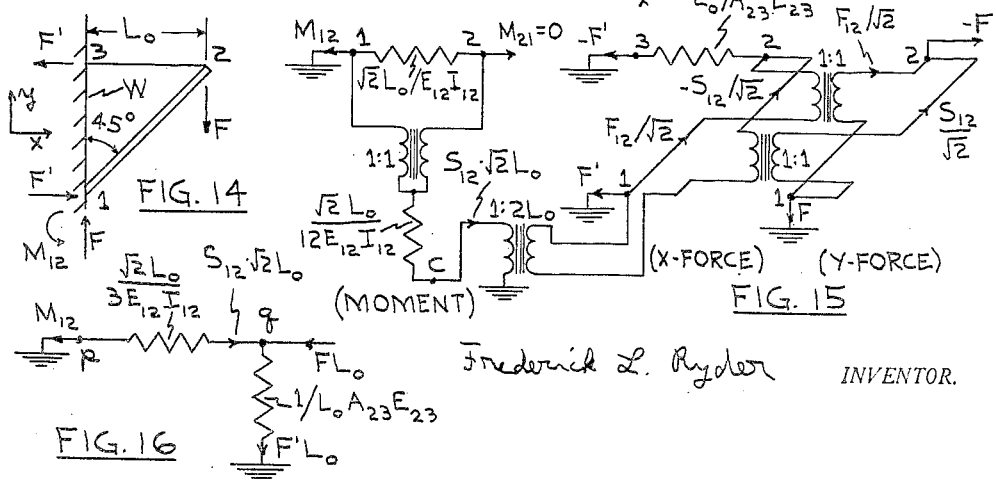
FIG. 14
FIG. 15
FIG. 16
Frederick L. Ryder
INVENTOR.

Frederick L. Ryder INVENTOR.

BY Darby & Darby
ATT'YS

United States Patent Office 2,766,933
Patented Oct. 16, 1956

2,766,933

ELECTRICAL ANALYZER OF STRUCTURES

Frederick L. Ryder, Lynbrook, N. Y.

Application June 21, 1950, Serial No. 169,340

16 Claims. (Cl. 235—61)

The object of the invention is to simulate statically loaded framed structures by means of equivalent electrical networks, or analogues, so that the unknown forces, moments, deflections and slopes of a given structure may be determined by direct electrical measurements taken on the corresponding analogue.

The invention may be explained by reference to the accompanying drawings, which may be described as follows:

Fig. 11 is a digram representing a member of a 3-dimensional rigid frame, said member being of constant cross-section at all points of its length.

Fig. 12 is a schematic wiring diagram of an electrical circuit analogue of the member of Fig. 11 but only with respect to the forces thereof.

Fig. 13 is a similar schematic wiring diagram of an electrical circuit analogue of the member of Fig. 11, but only with respect to the moments thereof.

Fig. 14 shows a diagram of a representative complete rigid frame whose characteristics are to be determined.

Figs. 15 and 16 are schematic wiring diagrams of electrical circuit analogues of the frame of Fig. 14.

As will be shown below, the present invention provides a generalized analogue computer for structures, both of the truss and rigid frame type, and offers simplified procedures for deriving and setting up the proper electrical circuit analogues whose electrical properties then yield desirable data with respect to the structure under consideration.

Electrical analogues of the general structural truss will be discussed in connection with the particular truss illustrated in Fig. 1. Throughout this specification the word "truss" will be intended to have the meaning commonly assigned to the expression "pin-connected truss"; that is, it will not include structures in which the branches suffer bending or torsional stress of such magnitude as to materially affect the design. Trusses in which the bending and torional effects cannot be neglected will be regarded as special cases of the rigid frame.

Figure 1:
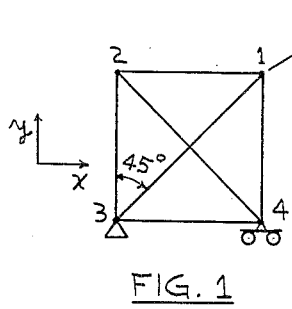
Fig. 1 is a schematic drawing of a representative truss whose characteristics are to be determined.
Figure 2:
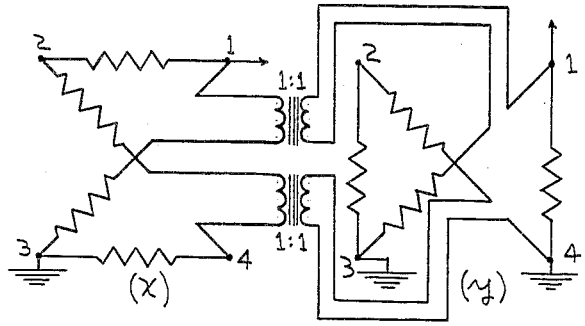
Fig. 2 is a schematic wiring diagram of an electrical circuit analogue of the truss of Fig. 1.

The joints of the truss in Fig. 1 are numbered 1, 2, 3, 4 as shown, the load or applied force is indicated as F, and the supports are as schematically indicated at 3 and 4. This truss thus comprises the upper horizontal member or branch 1—2, the lower horizontal member or branch 3—4, the left vertical member or branch 2—3, the right vertical member or branch 1—4, and the diagonal members or branches 2—4 and 1—3, shown at 45 degree angles to the remaining members. The symbol at joint 3 conventionally indicates a confining of that joint against both vertical and horizontal movement. The symbol at joint 4 conventionally indicates a confining of that joint against vertical but not horizontal movement. Rectangular coordinates $x$ and $y$ are selected at some convenient orientation, as shown. The corresponding analogue consists of an $x$-network and a $y$-network, as shown in Fig. 2, and will be described in detail.

In laying out the analogue electrical junctions are first positioned and numbered in both the $x$- and the $y$-networks to correspond with the corresponding joints in the truss. The electrical junctions are then connected by branch circuits in such a way as to simulate the configuration of the truss, except that truss branches which have no projection on a particular coordinate axis are omitted from the corresponding network. This is illustrated in the present case by the fact that branches 1—2 and 3—4 are omitted in the $y$-network, while branches 2—3 and 1—4 are omitted from the $x$-network, the other truss branches having corresponding electrical branches in both the $x$- and $y$-networks, designed as described below.

It is intended that currents flowing in the $x$- and $y$-network branches be respectively equivalent to the corresponding $x$- and $y$-components of force in the corresponding truss branches. For this to be true, it is necessary that the $x$- and $y$-currents corresponding to the $x$- and $y$-components of a particular truss branch force must have the ratio implied by the direction in which the force acts. This can be accomplished by coupling the appropriate corresponding $x$- and $y$-branches by transformers of suitable turns ratio. In the present case this is done by coupling the electrical $x$- and $y$-branches corresponding to truss branch 1—3, for example, by means of a transformer of one-to-one turns ratio. This ratio is dictated in this case by the fact that the truss branch 1—3 is at a 45 degree angle, having equal $x$- and $y$-projections. In the general case of a truss branch at an angle $\theta$ to the $x$-coordnate axis (measuring $\theta$ counter-clockwise from the $x$-axis), the turns ratio of the $x$- to $y$-electrical branches is proportional to tan $\theta$. Such transformers then constrain the currents in the corresponding branches of the $x$- and $y$-networks to have the desired proper ratio, proportional respectively to the ratio of the components of the force in the corresponding truss branch, along the $x$- and $y$-coordinate axes. No transformer is necessary if the truss branch is parallel to one of the coordinate axes, for in that case the current ratio in the corresponding electrical $x$- and $y$-branches must automatically have the value one-to-zero, as in the case of branch 1—2.

It is convenient, but not necessary, to adopt the following conventions for the interpretation of the direction of current: branch current flowing from the lower- to the higher-numbered junction of a branch represents tensile force in the corresponding truss branch; and external current withdrawn from a junction represents force applied to the corresponding truss joint.

The sense of the transformer windings must be such that the associated current ratio is correct as to sign as well as to magnitude. This requirement as to the sense of transformer windings will be tacitly assumed throughout the remainder of this specification.

Each electrical branch of both networks also includes a resistance, which is selected as proportional to the compliance of the corresponding truss branch. Thus, in Fig. 2, $R_{12}$ has a value proportional to the compliance of truss branch 1—2, etc. Where both x- and y-networks have a corresponding branch, equal resistance is inserted in each. Thus $R_{24}$ is in both the x- and y-networks, and is proportional to the compliance of truss branch 2—4. It will be understood that by compliance of a truss branch is meant the length L of the branch divided by the product of its cross-sectional area A and its modulus of elasticity E; the compliance is a measure of the change of length of the truss branch in response to a given applied force.

As shown in Fig. 1, a force or load F is assumed applied at joint 1. Then, in the analogue networks, currents proportional to the x- and y-components of the load are withdrawn at junction 1 by suitable A. C. sources, not indicated, both currents being at the same electrical phase. It will be understood that such current sources are connected between the junctions 1 and ground. In the example considered, both x- and y-junctions 3 are grounded, as is y-junction 4. This condition is imposed in view of the fact that the potentials of each electrical junction represent the respective x- and y-components of deflection of the corresponding truss joints from no-load position. Since joint 3 is constrained to have no x- or y-deflection, the potentials of junctions 3 are zero, or grounded. Similarly, since truss joint 4 is constrained to have no y-deflection, the y-network junction 4 is grounded.

The analogue has been set up in such a way that the vectorial summations of force applied to the various joints of the structure are equivalent to the summations of current leaving the corresponding electrical junctions of the x- and y-networks, so that in this respect the analogy is exact. A further requirement is that the voltage drops across the various electrical branches must be governed by the same equations as govern the corresponding x- and y-components of branch deflection in the truss. The components of branch deflection are caused by both stretching (or shortening) and rotation, the former being equal to the product of branch force and tensional (or compressive) compliance, and the latter being of the various magnitudes and directions dictated by the changes in branch length. Now, the x- and y-components of the changes in length are equivalent to voltage drops across the branch resistances, or to the products of branch current and branch resistance, the current representing the branch force and the resistance the compliance. It then follows that the transformer windings must experience voltage drops equivalent to the corresponding components of rotational deflection.

In general the analogue can be further improved by simulating any conditions of deflection imposed on the truss by its supports by means of equivalent voltage constraints. In the present case this is done by grounding the networks at the points indicated in Fig. 2. Deflections caused by thermal effects or by any other reason can be simulated by inserting corresponding sources of voltage at appropriate junctions or in appropriate branches. The voltages, measured below ground, at all electrical junctions are then proportional to the corresponding components of deflection in the truss. Hence, by measuring these voltages, and by measuring the unknown electrical currents, the truss is completely solved both as to forces (including reaction forces) and deflections. The fact that the present analogue permits reaction forces to be evaluated experimentally is of particular value when the reactions are statically indeterminate, that is, when they cannot be determined by the laws of equilibrium alone.

A further improvement of the analogue is possible, as follows. The branch resistances associated with a certain truss branch may be distributed in any manner among the associated electrical branches, providing the power loss is unchanged. This follows from the fact that structures, and electrical networks in which all currents and voltages are at the same phase, may be solved by minimizing the structural work of deformation and the electrical power dissipation respectively, subject to the conditions of equilibrium in the structure and the requirements of current-continuity in the network. Hence if the resistances associated with a certain truss branch are redistributed among the associated electrical branches in such a way as to affect neither the electrical power dissipation nor the equations of current-continuity, as is suggested here, then the analogue as a whole must remain unchanged. The transformer voltage drops must then automatically adjust themselves in such a way that the voltages at the electrical junctions will be unaffected. By means of this improvement the number of resistors required for the simulation of a given truss may be reduced to one per structural member. By way of illustration, one of the resistors $R_{24}$ may be omitted, provided the value of the other is changed to yield the same power dissipation, as by doubling its resistance value, the currents, of course, remaining unchanged. More generally, in the case of a truss branch inclined at angle $\theta$ from the x-axis the resistance in the corresponding electrical branch is multiplied by $\sec^2 \theta$ if placed in the x-network alone and by $\csc^2 \theta$ if in the y-network alone.

The analogue explained in connection with Fig. 1 can be extended to 2- and 3-dimensional trusses of any degree of complexity, including those in which the reactions are statically indeterminate. In the general 3-dimensional case, two transformers are required per truss branch, in order to fix the ratios among the three current components corresponding to each truss branch force.

Next to be discussed is the electrical analogue of a rigid frame, the latter being defined for the purpose of this specification as a framed structure in which the bending or torsional moment in at least one member is significant in design. Thus a truss with significant secondary stresses, that is, stresses caused by moment, is here considered to be a rigid frame.

Figure 3:
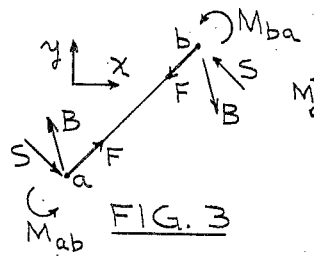
Fig. 3 is a schematic diagram of a representative member of a 2-dimensional rigid frame whose characteristics are to be determined, said member being of constant cross-section along its length.
Figure 4:
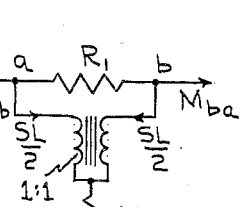
Figs. 4 and 5 are schematic wiring diagrams of electrical circuit analogues of the member of Fig. 3.

Fig. 3 shows a member of a 2-dimensional rigid frame, the member being straight, of constant cross-section throughout its length L, and loaded at its end-points $a$ and $b$ only. The forces and moments applied to the member by adjacent members and by external loads are B, $M_{ab}$ and $M_{ba}$, as shown. As a result of B, the member experiences the axial force F and the shear force S. An electrical analogue of this member, insofar as the effects of moment are concerned, is shown in Fig. 4, where certain moments are replaced by alternating currents, all currents being at the same electrical phase. The requirements of the analogue can be determined by considering the principle of minimum energy, which states that the work of deformation in a structure, and the power dissipation in an electrical network in which all voltages and currents are at the same phase, are a minimum, subject to the requirements of equilibrium in the structure and current-continuity in the network. By virtue of this principle, the solutions of a structure and of its electrical analogue are identical if the equations of equilibrium are replaced by the equations of current-continuity, and if the work of deformation is duplicated by the power dissipation.

In the particular case of the analogue shown by Fig. 4, these requirements are met in the following way. The equilibrium of moments acting on the member of Fig. 3 is expressed as follows:

$$M_{ab}+SL+M_{ba}=0 \quad (1)$$

This equation is seen to be duplicated in Fig. 4, since the sum of the currents $M_{ab}$, $M_{ba}$ and $SL$ of Fig. 4 is zero, by Kirchhoff's law. As for W, the work of deformation of the structural member, it is readily found to have the following value:

$$W=\frac{L}{2EI}\left(M_{ab}^2+M_{ab}\cdot SL+\frac{\overline{SL}^2}{3}\right) \quad (2)$$

where E is Young's modulus and I is the cross-sectional moment of inertia effective in bending. The equivalent value of P, the power dissipation in the analogue, can be obtained by means of the one-to-one transformer and the resistors $R_1$ and $R_2$ where $$\left.\begin{array}{l}R_1=L/EI \\ R_2=L/12EI\end{array}\right\} \quad (3)$$

Under these conditions there is obtained:

$$P=\frac{L}{EI}\left(M_{ab}^2+M_{ab}\cdot SL+\frac{\overline{SL}^2}{3}\right) \quad (4)$$

Note that P has been made equal to 2W. This is explained as follows: in doing work on a structure, the loads build up from zero to their final values, the average values being one-half of the final values; the work of deformation is based on the average values of load and on the final values of deflection (or slope). In electrical circuits, however, the power dissipation is based only on final values of current and voltage. Hence if P equals 2W, voltage can be made to be the analogue of deflection or slope, as will be seen.

By the well-known Castigliano's theorem for structures, $$\left.\begin{array}{l}\dfrac{\delta W}{\delta M_{ba}}=\theta_{ab} \\ \dfrac{\delta W}{\delta S}=D_{ab}\end{array}\right\} \quad (5)$$

where $\theta_{ab}$ and $D_{ab}$ are, respectively, the change of slope between $a$ and $b$ and the deflection of point $b$ normal to the tangential line through $a$. It can be shown that Castigliano's theorem also applies, except for the factor 2 discussed above, to electrical circuits in which all currents and voltages are at the same phase. This leads to the following results in connection with Fig. 4:

$$\left.\begin{array}{l}\dfrac{\delta\frac{P}{2}}{\delta M_{ba}}=V_{ab} \\ \dfrac{\delta P/2}{\delta(SL)}=V_{ac}\end{array}\right\} \quad (6)$$

where $V_{ab}$ is the voltage drop from $a$ to $b$, and $V_{ac}$ is the voltage drop from $a$ to $c$. Hence $V_{ab}$ and $V_{ac}$ are the analogues of $\theta_{ab}$ and $$\frac{D_{ab}}{L}$$

respectively. The transformer voltage drops automatically adjust themselves to this requirement.

Figure 5:
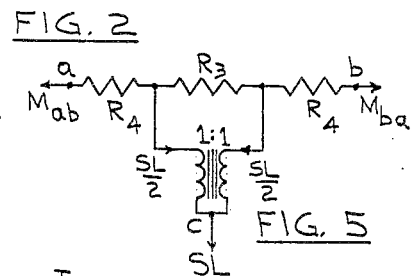

An infinite variety of other forms analogous to Fig. 4 exists. One of these is shown in Fig. 5. If $$R_3=\frac{2L}{3EI}$$

and $R_4=L/6EI$, then, by the principle of minimum energy, Figs. 4 and 5 are equivalent with regard to conditions at points $a$, $b$ and $c$, since the equations of current-continuity and the power dissipation are the same in one network as in the other.

As shown below, and particularly in the example of Figs. 14 and 15, this circuit analogue is completed, in any particular case, by imposing constraints analogous to those of the structure, as by grounding junctions of zero slope, open circuiting junctions of zero moment, and impressing currents corresponding to impressed moments and forces. Also, a force analogue is included in combination with the moment analogue, such as of Figs. 4 and 5.

The transformer losses may be included in the power loss of the analogue, and the transformer turns ratio may be compensated for the slight current-shunting effect of the equivalent transformer shunt resistance, in order to increase the accuracy of the analogy. This can be done with all analogues described in this specification.

The method can be extended to members of arbitrarily varying cross-section and of arbitrary shape within the plane of the rigid frame, the loads being applied in any manner at the ends and along the length of the member. It is merely necessary in each case to simulate the equations of equilibrium by the equations of current-continuity, and to replace twice the work of deformation by the power dissipation. Special cases are illustrated by Figs. 6, 7, 8 and 9, which will be explained in detail.

Figure 6:
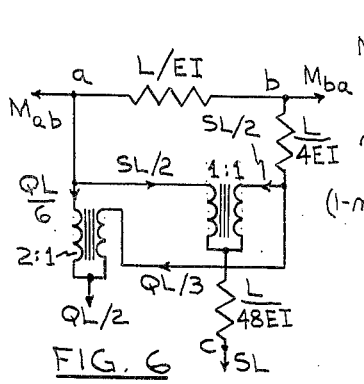
Fig. 6 is a schematic wiring diagram of an electrical circuit analogue of a rigid frame member similar to that of Fig. 3, but also having a uniformly distributed lateral load Q.

Fig. 6 is an analogue of a member which is straight, of constant cross-section, and is loaded by a known transverse load Q which is uniformly distributed along its length L. $M_{ab}$ and $M_{ba}$ are the moments applied by adjoining members, and S is the shear force at the point where $M_{ab}$ is applied which results from the end-forces applied by adjoining members. Moment equilibrium for the structural case is represented by the following equation:

$$M_{ab}+SL+M_{ba}+\frac{QL}{2}=0 \quad (7)$$

which is seen to be satisfied by the electrical analogue. With the resistances indicated, it can be shown that twice the work of deformation is simulated by the power, except for quantities involving Q alone, that is, quantities independent of the end-moments and the shear. This is immaterial in the overall validity of the analogy, for such quantities have no derivative with respect to the end-moments or shear, and hence do not affect the values which the end-moments and shear take on in order to minimize the work of deformation of the structure as a whole.

By Castigliano's theorem, it can be shown that the voltage drops from $a$ to $b$ and from $b$ to $c$ are respectively equal to the change of slope from $a$ to $b$ and to $1/L$ times the deflection of $a$ normal to the tangent line through $b$.

Figure 7:
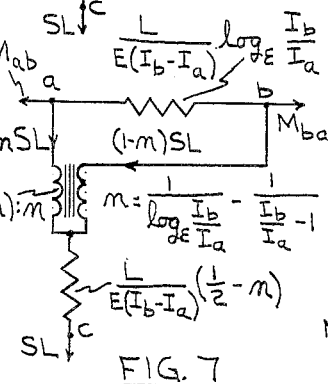
Fig. 7 is a similar schematic wiring diagram of an electrical circuit analogue of a rigid frame member similar to that of Fig. 3, but whose cross-section varies in such a way that the cross-sectional moment of inertia effective in bending varies linearly from one end of the member to the other.

Fig. 7 is an analogue of a member which is straight, loaded at the end-points only, and with cross-sectional moment of inertia effective in bending varying linearly from $I_a$ at $a$ to $I_b$ at $b$. The values of resistance and of transformer turns ratio are indicated. The voltage drops from $a$ to $b$ and from $b$ to $c$ have the same significance as in the previous case.

Figure 8:
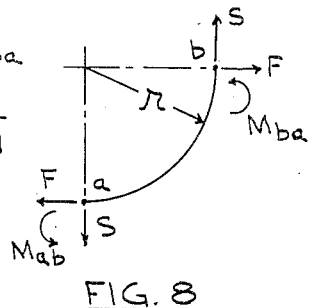
Fig. 8 is a schematic drawing of a quadrant-shaped member of a 2-dimensional rigid frame.
Figure 9:
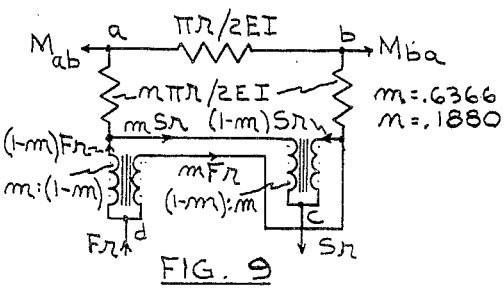
Fig. 9 is a schematic wiring diagram of an electrical circuit analogue of the member of Fig. 8.

Fig. 8 represents a quadrant-shaped member of radius $r$, of constant cross-section, loaded at the end-points only. The forces and moments applied by adjacent members and by external loads are indicated. An analogue is shown in Fig. 9, where the values of resistance and of transformer turns ratio are as indicated. The equation of moment-equilibrium is:

$$M_{ab}+Sr-Fr+M_{ba}=0 \quad (8)$$

This is satisfied by the analogue. Also, it can be shown that the power dissipation equals twice the work of deformation, except for very small errors in $\overline{F}r^2$ and $\overline{S}r^2$. Analogues which are theoretically exact can readily be devised, but that of Fig. 9 is recommended for simplicity.

The voltage drops between $a$ and $b$, $a$ and $c$, and $a$ and $d$ may be respectively designated as $V_{ab}$, $V_{ac}$ and $V_{ad}$, and can be interpreted as follows: with point $a$ fixed against deflection and rotation, $V_{ab}$ is the change of slope at $b$, $V_{ac}$ is very closely $1/r$ times the deflection at $b$ in the direction of S, and $V_{ad}$ is very closely $1/r$ times the deflection at $b$ in the direction of F.

Figure 10:
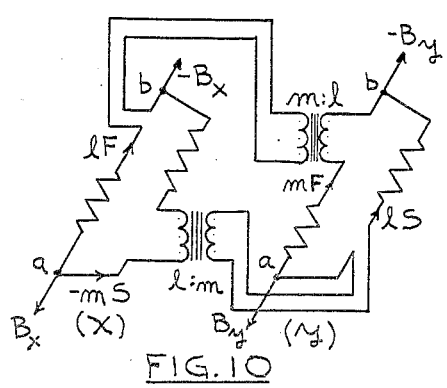
Fig. 10 is a circuit diagram of an electrical analogue of a straight member of a 2-dimensional rigid frame, the analogy extending only to the direct shear and axial forces and their effects.

In many rigid frames the effects of pure shear and axial force can be neglected, the only significant effects being due to bending. However, where the shear and axial effects are of interest, as in trusses with secondary stresses, an analogue such as is shown in Fig. 10 may be used for the member shown in Fig. 3. The currents $B_x$, $lF$, and $mS$ correspond to the $x$-components of the forces B, F and S in Fig. 3, respectively, and $B_y$, $mF$ and $lS$ to the $y$-components thereof, where $l$ and $m$ are the direction cosines of the branch with respect to the coordinate axes $x$ and $y$ of Fig. 3. The transformers have the indicated turns ratios.

Since S is the resultant of F and B, we may write the following vector equation, where bars are used to emphasize the vector sense of the quantities:

$$\overline{S} = \overline{B} + \overline{F} \quad (9)$$

In terms of $x$- and $y$-components, this becomes:

$$\left. \begin{array}{l} B_x + lF - mS = 0 \\ B_y + mF + lS = 0 \end{array} \right\} \quad (10)$$

The junction summations of current satisfy these equations. The ratio between the $x$- and $y$-components of shear, as well as the corresponding ratio for axial force, is maintained at its correct value by a transformer, whose turns ratio must be correct both as to magnitude and sense. The resistances in the shear and axial branches should be respectively proportional to the shear and axial compliances. Under these conditions, it can be shown that twice the work of deformation associated with direct shear and axial force is simulated by electric power, so that, by the principle of minimum energy, the analogy is valid. By Castigliano's theorem, the voltage drops from $a$ to $b$ represent the $x$- and $y$-components of branch deflection caused by pure shear and axial force. Where this deflection is negligible compared to the deflection caused by bending, the resistors may be omitted, and the analogue may be used merely for the evaluation of F and S from a knowledge of B, $l$ and $m$.

Next to be discussed is the analogue of a member of a 3-dimensional rigid frame, said member being straight, of constant cross-section at all points of its length $L$, and loaded at the end-points only. The vector forces and moments associated with such a member are shown by the barred quantities in Fig. 11, where the symbol $\delta$ is used to denote the axis about which each moment acts. $\overline{B}$ is the applied end-force, $\overline{C}_{ab}$ and $\overline{C}_{ba}$ are the total applied end-moments, $\overline{F}$ is the axial force, $\overline{S}$ the shear, $\overline{M}_{ab}$ and $\overline{M}_{ba}$ are the end bending-moments, and $\overline{T}$ is the torsional moment. The coordinate axes $x$, $y$ and $z$ are chosen as convenient.

An electrical analogue of the forces is shown in Fig. 12, which consists of an $x$-, a $y$- and a $z$-network. The direction cosines of the branch are $l$, $m$ and $n$ so that the currents $lF$, $mF$ and $nF$ are respectively analogous to the $x$-, $y$- and $z$-components of axial force, the correct ratios among these components being maintained by transformers 1 and 2, of appropriate turns ratio. The currents analogous to the components of shear are designated by appropriate subscripts, and the relation among these currents is governed by the fact that the shear vector is normal to the branch, so that $$lS_x + mS_y + nS_z = 0 \quad (11)$$

This relationship is achieved by transformers 3, 4 and 5. Further, the connections are such as to satisfy the vectorial equations resulting from the fact that shear is the resultant of the applied and axial forces, namely:

$$\overline{S} = \overline{B} + \overline{F} \quad (12)$$

Hence the conditions governing the equilibrium of the forces are satisfied by the equations of current-continuity. If the deflections associated with shear and axial force are appreciable, they may be taken into account by inserting resistors proportional to the shear and axial compliances in the shear and axial branches respectively. Since the power dissipation is now equal to twice the work of deformation associated with pure shear and axial forces, the analogy is valid. By Castigliano's theorem, the voltage drop across each component network is equivalent to the corresponding component of branch deflection caused by direct shear and axial forces.

An electrical analogue for the moments is shown in Fig. 13, and consists of an $x$-, a $y$- and a $z$-network, the coordinates denoting the axes about which the respective moment components act. The quantities $lT$, $mT$ and $nT$ are the respective components of torsion, the correct ratios among these quantities being maintained by transformers 1 and 2. The currents analogous to the components of bending moment are indicated, the relation among these components being governed by the fact that the bending moment vector is normal to the branch, so that $$lM_{ab_x} + mM_{ab_y} + nM_{ab_z} = 0 \quad (13)$$

This relationship is achieved by transformers 3, 4 and 5. At joints $a$ and $b$ the connections are such as to satisfy the vector relationships among the moments, namely:

$$\left. \begin{array}{l} \overline{C}_{ab} = \overline{T} + \overline{M}_{ab} \\ \overline{C}_{ba} = -\overline{T} + \overline{M}_{ba} \end{array} \right\} \quad (14)$$

where it is noted that the torsional moments applied to $a$ and $b$ are opposite in sign.

The bending moment vector at any point of the member is a function of the shear components. It can be shown that the differences between the bending moment components at $a$ and $b$ are denoted by the following respective quantities:

$$\left. \begin{array}{l} L\ (nS_y - mS_z) \\ L\ (lS_z - nS_x) \\ L\ (mS_x - lS_y) \end{array} \right\} \quad (15)$$

These currents are set up by suitable transformer tie-in with the shear branches in Fig. 12, and are withdrawn from the networks of Fig. 13 as indicated. Thus all considerations of moment equilibrium have been satisfied.

The torsional work is simulated by inserting a resistance proportional to the torsional compliance in the torsion branches. The bending work is simulated by inserting in the bending branches networks similar to that of Fig. 4 or Fig. 5. Since the power dissipation is now analogous to twice the work of deformation, the analogy is valid. By Castigliano's theorem, the voltage drops from $a$ to $b$ are equivalent to the corresponding changes of slope, the direction of the slope being taken as that of the associated axis of rotation.

Very material simplifications are possible if one of the direction cosines happens to be zero or unity. On the other hand, the situation may become more complex, since the member may not be straight, and may be of variable cross-section and loaded at various points along its length. In any case, the analogy is valid if the equations of equilibrium are simulated by the equations of current-continuity, and if twice the work of deformation is simulated by the power dissipation.

To construct an analogue for a complete rigid frame, it is necessary to connect together the analogues of individual members in such a way that the conditions of force and moment equilibrium imposed on the individual members of the rigid frame are duplicated by conditions of current-continuity. The constraints imposed on the deflections and slopes of the rigid frame by its supports, by thermal effects, or by any other agency are then duplicated by conditions of voltage in the analogue, and currents are withdrawn from the appropriate joints of the analogue to simulate the conditions of loading. In general, the analogy will be valid only with respect to the end-points of the members, internal points requiring separate calculation after the end conditions have been evaluated.

As an example of the simulation of a complete rigid frame, there will be discussed the analogue of the 2-dimensional structure shown in Fig. 14. Member 2—3 is a cable, and can resist only tension. Member 1—2 can resist axial force, shear and bending, and is rigidly connected to the indicated supporting wall W at joint 1. The load is applied at joint 2, and the reactions at 1 and 3 are as indicated, and are related by the following equation of moment equilibrium:

$$M_{12} + L_0(F' - F) = 0 \qquad (16)$$

The moment analogue and the analogue of the $x$- and $y$-forces are shown in Fig. 15. The $y$-network is grounded at 1 to simulate zero $y$-deflection, and has the load current $-F$ withdrawn from it at 2 by a suitable generator, not shown. The $x$-network is grounded at 1 and 3 to simulate zero $x$-deflection. No resistance is inserted in the shear or axial branches of member 1—2, since the associated work is considered negligible compared to the bending work in this member. The moment network is grounded at 1 to simulate zero slope change at joint 1, and is opened to the right of 2 to simulate zero moment at joint 2. The shear current $S_{12} \cdot \sqrt{2} L_0$ is supplied to the moment network by suitable transformer tie-in with one of the shear branches, in this case the $x$-shear branch. The unit of length may be chosen so as to make the transformer turns ratio $1:2L_0$ equal to some convenient ratio, such as 1:1. The scale factor between current and moment or force and between resistance and the analogous structural parameters may be chosen at pleasure, subject to requirements of consistency. $I$ is the cross-sectional moment of inertia effective in bending, $A$ is the cross-sectional area, and $E$ is Young's modulus.

Detailed calculations will show that the equations of equilibrium of the structure are simulated by the equations of current-continuity in the analogue, and that twice the work of deformation is simulated by the electrical power dissipation. Hence the analogy is valid. By Castigliano's theorem, the voltage (measured below ground) at 2 in the moment network is equivalent to slope, the voltages at 2 in the $x$- and $y$-network are respectively equivalent to the $x$- and $y$-components of deflection, and the voltage at point $c$ in the moment network is equivalent to $$\frac{1}{\sqrt{2} L_0}$$

times the deflection of joint 2, measured normal to the original direction of member 1—2.

Drastic simplifications can often be made in the analogue of a complete rigid frame with the aid of a small amount of supplementary analysis. For the structure of Fig. 14, for example, use can be made of the following conditions of equilibrium:

$$\left. \begin{array}{l} M_{12} + S_{12} \cdot \sqrt{2} L_0 = 0 \\ S_{12} = \dfrac{F' - F}{\sqrt{2}} \end{array} \right\} \qquad (17)$$

These equations are satisfied by the equations of current-continuity in Fig. 16, where $FL_0$ is introduced at junction $q$ by a suitable generator, not shown. The work of deformation, W, can be written as follows:

$$\left. \begin{array}{l} W_{12} = \dfrac{1}{2} \cdot \dfrac{(S_{12} \cdot \sqrt{2} L_0)^2}{3} \cdot \dfrac{\sqrt{2} L_0}{E_{12} I_{12}} \\ W_{23} = \dfrac{1}{2} (F')^2 \cdot \dfrac{L_0}{A_{23} E_{23}} \end{array} \right\} \qquad (18)$$

The corresponding powder dissipations are achieved in the analogue by means of the indicated resistors. The analogy is then valid, and the structural values corresponding to the unknown currents can be determined by electrical measurement. By applying Castigliano's theorem to branch $p$—$q$, the voltage at $q$ is seen to be analogous to $$\frac{1}{\sqrt{2} L_0}$$

times the deflection of joint 2 of Fig. 14 in the direction normal to the original direction of member 1—2. The slope and the $x$- and $y$-components of deflection of joint 2 are not experimentally determinable from the simplified analogue of Fig. 16, but can readily be determined by a supplementary calculation.

Figure 17:
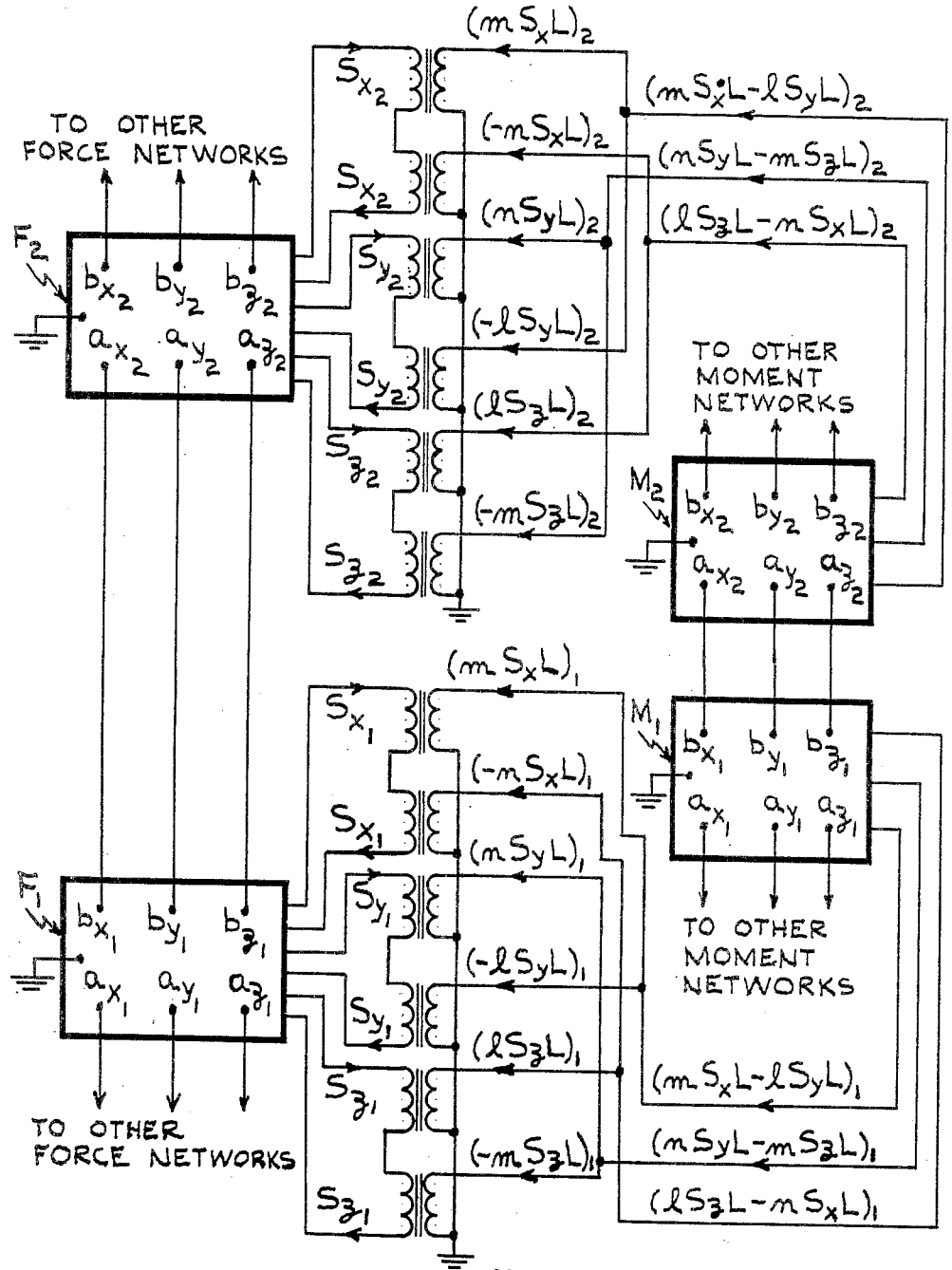
Fig. 17 is a schematic wiring diagram showing the interconnection of the networks of the previous figures.

Fig. 17 shows the general method of interconnecting the force and moment networks for any two rigidly connected members, each of which is straight, has constant cross-section, is loaded at the ends only, and has projections on all three coordinate axes. The members will be designated as 1 and 2 respectively, and these numbers will be used as subscripts on symbols associated with the respective members. The symbols $x$, $y$ and $z$ will also be used as subscripts for the purpose of distinguishing among the three coordinate axes. As before, the terminals corresponding to the two ends of each member are designated as $a$ and $b$ respectively.

For each member the circuit consists of a force network and moment network similar to Figs. 12 and 13 respectively, shown here in block form as F and M respectively, and connected together by six transformers as shown in Fig. 17. Each of the three shear branches in each force network is cut, and the cut ends are connected with one side of each of two transformers, as shown. The turns ratio of each transformer is such that the current in its other side has the value shown in Fig. 17 and these other sides are connected to each other and to the moment network M so as to withdraw from the latter the currents, involving $S_x$, $S_y$ and $S_z$, shown leaving Fig. 13.

The two force networks F are then connected as shown and similarly for the networks M. Each force-network junction should be grounded, if the corresponding rectangular component of deflection is constrained to be zero in the structure; or a suitable force-representative value of current should be withdrawn from it, if the associated joint in the structure is subjected to a corresponding component of externally applied force. Similarly, each moment-network junction should be grounded, if the corresponding rectangular component of slope is constrained to be zero in the structure; or a suitable moment-representative value current should be withdrawn from it, if the associated joint in the structure is subjected to a corresponding component of applied moment.

The analogues described herein may be applied to structures, or parts thereof, which are continuous rather than framed. It is merely necessary to replace the continuous structure by a framed structure which approximates the original structure to the desired degree of accuracy. The analogue is then applied to the equivalent framed structure.

In the following claims, the term "connected," where applied to electrical components, is intended to mean either a direct wire connection or a connection through a further circuit element, such as a resistor or transformer winding.

I claim:

1. An electrical analogue computer for statically loaded pin-connected structures having a plurality of structural members with projections on a set of independent coordinate axes, comprising a coordinate-circuit for each of said coordinate axes, each said coordinate-circuit comprising a network for each structural member which has a projection along the coordinate axis corresponding to such coordinate-circuit, each of said networks accordingly being representative of a single structural member; each of said networks comprising a resistor having a resistance value proportional to the compliance of its represented structural member, each of said networks which represents a structural member with projections along more than one of said coordinate axes also including a transformer having a first winding in series with the resistor of said network and a second winding in series with the resistor of the network of another coordinate-circuit representing the same structural member; each of said networks being of the two-terminal type with a pair of terminals respectively representing the ends of its represented structural member, the terminals of said networks of each coordinate-circuit being interconnected in the same manner as the respectively represented ends of said structural members are joined, whereby each joint between two or more structural members which have projections along the same coordinate axis is represented by a junction of terminals of their representative coordinate-circuit networks; means grounding each junction of each coordinate circuit representative of a structure joint constrained against deflection along a corresponding coordinate axis, and means connecting a current source between ground and each junction of each coordinate-circuit representative of a structure joint to which is applied a load force component along the corresponding coordinate axis.

2. An electrical analogue computer for statically loaded pin-connected plane trusses having a plurality of members with projections along $x$- and $y$-coordinate axes, comprising an $x$-coordinate circuit having a resistor representative of the $x$-projection of each of said members, a $y$-coordinate circuit having a resistor representative of the $y$-projection of each of said members, said $x$-coordinate resistors being interconnected in the same manner as the $x$-projections of said members, and said $y$-coordinate resistors being interconnected in the same manner as the $y$-projections of said members, whereby each junction of resistors corresponds to and represents a joint of said truss, a transformer for each member which has projections along both $x$- and $y$-axes, said transformer having one winding in series with the resistor representative of the $x$-projection of said member and another winding in series with the resistor representative of the $y$-projection of said member, means connecting to ground all terminals of said $x$- and $y$-circuits representative of truss joints constrained against $x$- and $y$-deflections, respectively, and means coupling a current source between ground and each of said terminals of said $x$- and $y$-circuits representative of truss joints to which respective $x$- and $y$-component load forces are applied, the currents of said sources being proportional to said force components.

3. An electrical analogue computer for determining moments and elastic slopes in a statically loaded rigid frame structure having structural members interconnected at various joints, said computer comprising a plurality of three-terminal networks, each network being representative of a respective structural member and having first, second and third terminals, the first and second terminals of each said networks being respectively representative of the ends of the structural member represented by such network, said first and second terminals of said networks being connected together in the same manner as the connections of the ends of said structural members of said rigid frame structure whereby each joint between two of said structural members is represented by a junction of two of said first or second terminals of the networks representing such joined structural members, each of said networks including a first resistor connected between the first and second terminals thereof, and also including a transformer having first and second windings said winding being connected in series between said first and second terminals of such network, said resistor having a resistance value inversely proportional to the stiffness of its represented structural member with respect to pure bending, each of said networks including a second resistor in series between its third terminal and the junction of its transformer windings, means for withdrawing from the third terminal of each of said networks a current proportional in magnitude to the product of the length and shear force for the represented structural member, said current supply means including a current source having a first terminal connected to said third terminal of such network and a second terminal connected to all first or second network terminals representing joints in the rigid frame structure constrained by the supports thereof to have zero elastic slope.

4. An electrical analogue computer for determining moments and elastic slopes of structural members interconnected at various joints and forming a statically loaded rigid frame, comprising, a plurality of three-terminal networks, equal in number to the number of said structural members, and each network being representative of an individual and respective one of said structural members, each of said networks having first, second and third terminals, the first and second terminals of each network respectively corresponding to and representing the ends of the structural member represented by said network, said first and second network terminals being interconnected in the same manner as the interconnection of the ends of said structural members, whereby each joint between particular ends of said structural members is individually and respectively represented by a junction of the first and/or second network terminals respectively representative of said joined ends, each of said networks including a resistance and a transformer, said resistance being connected between the first and second terminals of such network and said transformer having two windings, one winding connected between the first and third terminals of such network and the other between the second and third of such network, and a source of alternating current coupled to each of the third terminals of said networks.

5. A computer as in claim 4 wherein, in each of said networks, the said resistor is connected directly to said first and second network terminals, one end of said one transformer winding is connected directly to said first network terminal, one end of said other transformer network winding is connected directly to said second network terminal, the other ends of said transformer windings being directly interconnected, and further including a second resistor connected directly between said joined transformer winding ends and said third terminal.

6. A computer as in claim 5 wherein said second resistor has a resistance equal to $\frac{1}{12}$th that of said first resistor, and said transformer has a one-to-one current transformation ratio.

7. A computer as in claim 4 wherein, in each of said networks, second and third resistors are connected in series with said first mentioned resistor between said first and second network terminals, and one end of one winding of said transformer is connected to the junction of said first and second resistors, one end of the other winding of said transformer is connected to the junction of said first and third resistors, the other end of said transformer windings being directly connected together and to said third network terminal.

8. A computer as in claim 7 wherein said second and third resistors are of equal resistance having a value one-fourth the resistance of said first resistor.

9. A computer as in claim 8 wherein said transformer has a one-to-one current transformation ratio.

10. A computer as in claim 4 wherein each of said networks further includes a second transformer having two windings, one end of one of said latter windings being directly connected to one end of another of said latter windings and to a further source of current, the other end of said one latter winding being connected to said first network terminal, the other end of said other latter winding being connected to said second network terminal, said joined ends of said second transformer windings forming a fourth terminal for said network, and a further source of current connected to said fourth terminal.

11. An analogue computer for determining forces, moments, deflections and elastic slopes in structures having a plurality of interconnected members, comprising a two-terminal force network for each member, said force networks being interconnected similarly to the interconnection of said members, a three-terminal moment network for each member, said moment networks having respective pairs of terminals interconnected similarly to said members and also having third terminals, and respective current sources coupled to said third terminal.

12. An analogue computer as in claim 11, wherein each of said force networks has parallel-connected shear and tension branches.

13. An analogue computer as in claim 11 wherein each of said moment networks has a two-terminal torsion branch coupled in parallel with a pair of terminals of its respective three-terminal branch.

14. An electrical analogue computer for statically loaded plane rigid frames having a plurality of members with projections on a pair of independent first and second coordinate axes, for determining forces, moments, deflections and elastic slopes of said members, comprising a first-coordinate circuit, a second-coordinate circuit and a moment circuit; said first-coordinate circuit comprising a respective two-terminal force network representative of the first-coordinate projection of each of said structural members, each of the terminals of each such force network representing a respective end of the represented structural member, said first-coordinate circuit networks having their terminals connected to one another in respectively the same manner as their represented structural member ends are joined in said frame, whereby each junction between two of said first-coordinate circuit networks represents a joint between two of said structural members, each of said first-coordinate circuit two-terminal force networks comprising a pair of parallel-connected tension-force-representative and shear-force-representative branches; said second-coordinate circuit comprising a respective two-terminal force network representative of the second-coordinate projection of structural members, each of said terminals of each of said second-coordinate force networks representing a respective end of the corresponding structural member represented by such network, said second-coordinate circuit networks having their terminals connected to one another in respectively the same manner as their represented structural member ends are joined in said frame, whereby each junction between two of said second-coordinate circuit networks represents a joint between two of said structural members, each of said second-coordinate circuit two-terminal networks comprising a pair of parallel-connected tension-force-representative and shear-force-representative branches; each of said first-coordinate and second-coordinate circuit network branches comprising a resistor adapted to have a resistance value inversely proportional to the respective tensional or shear stiffness of its represented structural member; each of said first-coordinate circuit network tension-force-representative branches which is representative of a structural member having projections on both of said coordinates axes also including one winding of a transformer having a second winding connected in the second-coordinate circuit network tension-force-representative branch representing the same structural member, the current transformation ratio of said transformer being equal to the ratio of the projection of said structural member on the first coordinate axis to its projection on the second coordinate axis; each of said first-coordinate circuit network shear-force-representative branches which is representative of a structural member having projections on both of said coordinate axes also including in series with the resistor thereof one winding of a transformer whose other winding is in series with the resistor of the shear-force-representative branch of the second-coordinate circuit network representing the same structural member, the ratio of current transformation of each of said latter transformer being equal to the negative of the ratio of the projection of said latter structural member upon said second-coordinate axis to its projection upon said first-coordinate axis; said moment circuit comprising a three-terminal network representative of each of said structural members, first and second terminals of said three-terminal network representing the respective ends of the represented structural member, said moment circuit network first and second terminals being connected in respectively the same manner as the represented ends of said structural members are joined in said frame, whereby each junction between two moment networks represents a joint between two of said structural members; each of said first-coordinate circuit network shear branches also including one winding of a further transformer in series connection, the other winding of said further transformer being connected between a potential datum and the third terminal of the moment circuit network representative of the same structural member, the ratio of current transformation of said further transformer being proportional to the length of its represented structural member divided by the sine of the angle between said represented structural member and said first-coordinate axis; each of said moment circuit networks also including another transformer having one winding connected between the first and third terminals of such moment network and the other winding connected between said second and third terminals thereof; and means withdrawing alternating currents from the various junctions of said first-coordinate and second-coordinate circuits whose represented joints in said rigid frame structure are under applied load and including respective sources of alternating current each having one terminal connected to the respective network junction and the other terminal connected to said potential datum, those terminals of said first- or second-coordinate circuit networks representative of points of said structure whose deflection components parallel to the respective coordinate axis are constrained to zero being connected to said potential datum and those of the first or second terminals of said moment circuits whose corresponding points in said rigid frame structure are constrained to zero elastic slope being connected to said potential datum.

15. In an analogue computer, a moment network of the three-terminal type, comprising a bending branch having first, second and third terminals, a resistor coupled between said first and second terminals, a transformer having a pair of windings, each having one end coupled to a respective first and second terminal, the other ends of said windings being coupled to said third terminal, and a torsion branch coupled also to said first and second terminals, and comprising a resistor.

16. An analogue computer for determining forces, moments, deflections and elastic slopes of the members of a rigid frame having projections along a set of independent coordinates, comprising a set of coordinate circuits, each formed of a plurality of force networks and a plurality of moment networks, each of said force network comprising parallel-connected tension and shear branches, each of said moment networks comprising a three-terminal bending moment branch and a two-terminal torsion branch connected in parallel to a pair of terminals of its corresponding bending moment branch, each of said force and moment networks representing a frame member having a projection along the coordinate axis corresponding to its coordinate circuit, those moment networks of different coordinate circuits representing the same frame member which have their bending moment branches intercoupled by respective transformers having a winding coupled between the said pair of terminals of such moment networks and also having intercoupled transformers in their torsion branches.

References Cited in the file of this patent

UNITED STATES PATENTS 2,087,667   Hedin _____ July 20, 1937

OTHER REFERENCES

"Structural Analysis by Electric Circuit Analogies," Bush, Journal of the Franklin Institute, vol. 217, No. 3, March 1934, pp. 289–330.

"Network Analyzer Solution of the Equivalent Circuits for Elastic Structures," Carter and Kron, Journal of the Franklin Institute, December 1944, pp. 443–452.